US007596369B2

(12) United States Patent
Alperin et al.

(10) Patent No.: US 7,596,369 B2
(45) Date of Patent: Sep. 29, 2009

(54) TRANSLATION OF MESSAGES BETWEEN MEDIA TYPES

(75) Inventors: Jordan Alperin, Denver, CO (US); Rich Cerami, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 447 days.

(21) Appl. No.: 11/399,098

(22) Filed: Apr. 5, 2006

(65) Prior Publication Data
US 2007/0239880 A1    Oct. 11, 2007

(51) Int. Cl.
H04L 29/08    (2006.01)
(52) U.S. Cl. .................... 455/414.4; 455/466; 455/428; 370/328; 370/338
(58) Field of Classification Search .............. 455/414.4, 455/466, 428; 370/328, 338
See application file for complete search history.

(56) References Cited

U.S. PATENT DOCUMENTS

| 6,442,606 | B1 | 8/2002 | Subbaroyan et al. |
| 6,556,217 | B1 | 4/2003 | Makipaa et al. |
| 6,564,264 | B1 | 5/2003 | Creswell et al. |
| 6,694,004 | B1 | 2/2004 | Knoerle et al. |
| 6,782,253 | B1 | 8/2004 | Shteyn et al. |
| 6,799,174 | B2 | 9/2004 | Chipman et al. |
| 6,816,582 | B2 | 11/2004 | Levine |
| 6,826,173 | B1 | 11/2004 | Kung et al. |
| 6,832,259 | B2 | 12/2004 | Hymel et al. |
| 6,879,838 | B2 | 4/2005 | Rankin et al. |
| 6,938,087 | B1 | 8/2005 | Abu-Samaha |
| 7,013,331 | B2 | 3/2006 | Das |
| 7,072,056 | B1 | 7/2006 | Greaves et al. |
| 7,219,163 | B2 | 5/2007 | Robinson et al. |
| 7,272,662 | B2 | 9/2007 | Chesnais et al. |
| 2002/0102965 | A1 | 8/2002 | Mandahl et al. |
| 2002/0191450 | A1 | 12/2002 | North et al. |
| 2003/0088633 | A1 | 5/2003 | Chiu et al. |
| 2003/0147369 | A1 | 8/2003 | Singh et al. |
| 2003/0149646 | A1 | 8/2003 | Chen et al. |
| 2003/0172139 | A1 | 9/2003 | Srinivasan et al. |
| 2003/0172175 | A1 | 9/2003 | McCormack et al. |
| 2004/0054719 | A1 | 3/2004 | Daigle et al. |
| 2005/0015443 | A1 | 1/2005 | Levine et al. |
| 2007/0097394 | A1* | 5/2007 | Zaima et al. ............... 358/1.13 |

(Continued)

OTHER PUBLICATIONS

U.S. Appl. No. 11/228,446, filed Sep. 15, 2005, Jordan Alperin.

(Continued)

*Primary Examiner*—Nghi H Ly (57) ABSTRACT

Systems, methods, and machine-readable media are disclosed to provide content of various media types to various platforms or devices. In one embodiment, providing content of a first media type to a recipient end device can comprise receiving from an initiating end device a request for a communication with the recipient end device. The first media type can be determined from the request and a second media type appropriate for use by the recipient end device can be determined. A service to convert the content of the first media type to content of the second media type can be determined. The indication of the content of the first media type can be submitted to the service and an indication of the content of the second media type can be received from the service. The content of the second media type can then be provided to the recipient end device.

10 Claims, 5 Drawing Sheets

U.S. PATENT DOCUMENTS

2007/0239895 A1 * 10/2007 Alperin et al. .............. 709/246

OTHER PUBLICATIONS

U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399;097, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.

* cited by examiner

TRANSLATION OF MESSAGES BETWEEN MEDIA TYPES

CROSS REFERENCE TO RELATED APPLICATIONS

This application is related to co-pending U.S. patent application Ser. No. 11/255,089 entitled "Cross-Platform Support for a Variety of Media Types" filed Oct. 19, 2005 and U.S. patent application Ser. No. 11/399,585 entitled "Cross Platform Push of Various Media Types" filed contemporaneously herewith, both of which are herein incorporated by reference.

BACKGROUND OF THE INVENTION

Embodiments of the present invention relate generally to communications networks and more particularly to providing content of various media types to platforms or devices not normally associated or compatible with those media types.

The term convergence is commonly used to describe the coming together or combining of two or more disparate disciplines or technologies. One well known example of convergence in telecommunications is Voice Over Internet Protocol (VOIP) which combines voice communications with data networks. Other examples of convergence have included providing the ability to access types of content or data from a device not normally associate with that type of content or data. For example, many cellular telephones today allow a user to access information other than simply making phone calls such as allowing the user to read and send emails.

Further convergence, particularly in telecommunications, has been much discussed but slow in developing. One reason true convergence between different types of platforms, devices, media types, etc has been slow in developing is that there has been no common way to interface a number of different types of devices, services, media types, etc. As with the cell phone example discussed above, convergence efforts have been limited to combinations of services provided by one service provider. Furthermore, addition or expansion of services is generally difficult and expensive, requiring extensive modifications to underlying hardware and software to provide the additional services. There has not been a common way to transparently combine services offered by different service providers and make these different services, offering different media types, available to a wide range of end devices and/or platforms.

Hence, there is a need for methods and systems that allow for more transparent combinations or convergence of different devices, services, media types, etc.

BRIEF SUMMARY OF THE INVENTION

Systems, methods, and machine-readable media are disclosed to provide content of various media types to platforms or devices not normally associated or compatible with those media types. In one embodiment, a method of providing content of a first media type to a recipient end device not normally associated with the first media type can comprise receiving from an initiating end device a request for a communication with the recipient end device. The request from the initiating end device can also include an indication of the recipient end device based on, for example, a selection of a recipient end device from a user of the initiating end device, an indication of the content of the first media type, an indication of the second media type, etc.

The method can further comprise detecting the first media type from the request and determining a second media type appropriate for use by the recipient end device. Determining a second media type appropriate for use by the recipient end device can be based on, for example, preferences of a user of the recipient end device, the device type of the recipient end device, etc.

The method can further comprise determining a service to convert the content of the first media type to content of the second media type. The indication of the content of the first media type can be submitted to the service and an indication of the content of the second media type can be received from the service. The content of the second media type can then be provided to the recipient end device.

According to one embodiment, determining the service to convert the content of the first media type to content of a second media type can comprise reading from the request an indication of the first media type and an indication of the second media type and selecting a service to convert the content of the first media type to content of the second media type from a plurality of services based on the indication of the first media type and the second media type. Alternatively, determining the service to convert the content of the first media type to content of a second media type can comprise reading preference information associated with the recipient end device, the preference information indicating one or more media types compatible with the recipient end device. A media type for the content of the first media type can be determined and a service to convert the content of the first media type to content of the second media type can be selected from a plurality of services based on the first media type and the preference information associated with the recipient end device.

According to another embodiment, a system for cross-platform communications of a variety of media types can comprise a communications bus and a user profile database communicatively coupled with the communications bus and adapted to maintain profile information for a plurality of end devices. A first end device can be communicatively coupled with the communications bus and adapted to send and receive common language messages via the communications bus, to translate common language messages received from the communications bus to a format specific to the end device based on the type, and to store user profile information in the user profile database. A second end device can be adapted to send and receive common language messages via the communications bus, to translate common language messages received from the communications bus to a format specific to the end device based on the type, and to store user profile information in the user profile database.

According to one embodiment, the system can also include a client controller communicatively coupled with the communications bus and the second end device. The client controller can be adapted to receive from the first end device a common language message indicating a request for a communication with the second end device. The common language message can include an indication of content of a first media type. The client controller can be adapted to detect the first media type from the request and determine a second media type appropriate for use by the recipient end device. Determining a second media type appropriate for use by the recipient end device can be based on, for example, preferences of a user of the recipient end device, the device type of the recipient end device, etc.

The client controller can be further adapted to determine a service to convert the content of the first media type to content of the second media type. The indication of the content of the first media type can be submitted to the service and an indication of the content of the second media type can be received from the service. The content of the second media type can then be provided to the recipient end device by the client controller.

According to yet another embodiment, a machine-readable medium can have stored thereon a series of instruction for which, when executed by a processor, cause the processor to provide content of a first media type to a recipient end device not normally associated with the first media type by receiving from an initiating end device a request for a communication with the recipient end device, wherein the communication includes an indication of the content of the first media type. The first media type can be detected from the request. A second media type appropriate for use by the recipient end device can be determined. A service to convert the content of the first media type to content of the second media type can be determined. The indication of the content of the first media type can be submitted to the service. An indication of the content of the second media type can be received from the service. The content of the second media type can be provided to the recipient end device.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide content of various media types to platforms or devices not normally associated or compatible with those media types. Generally speaking, providing content of a first media type to a recipient end device not normally associated with the first media type can comprise receiving from an initiating end device a request for a communication with the recipient end device. The request from the initiating end device can also include an indication of the recipient end device based on, for example, a selection of a recipient end device from a user of the initiating end device, an indication of the content of the first media type, an indication of the second media type, etc.

The method can further comprise detecting the first media type from the request and determining a second media type appropriate for use by the recipient end device. Determining a second media type appropriate for use by the recipient end device can be based on, for example, preferences of a user of the recipient end device, the device type of the recipient end device, etc.

The method can further comprise determining a service to convert the content of the first media type to content of the second media type. The indication of the content of the first media type can be submitted to the service and an indication of the content of the second media type can be received from the service. The content of the second media type can then be provided to the recipient end device.

Figure 1:
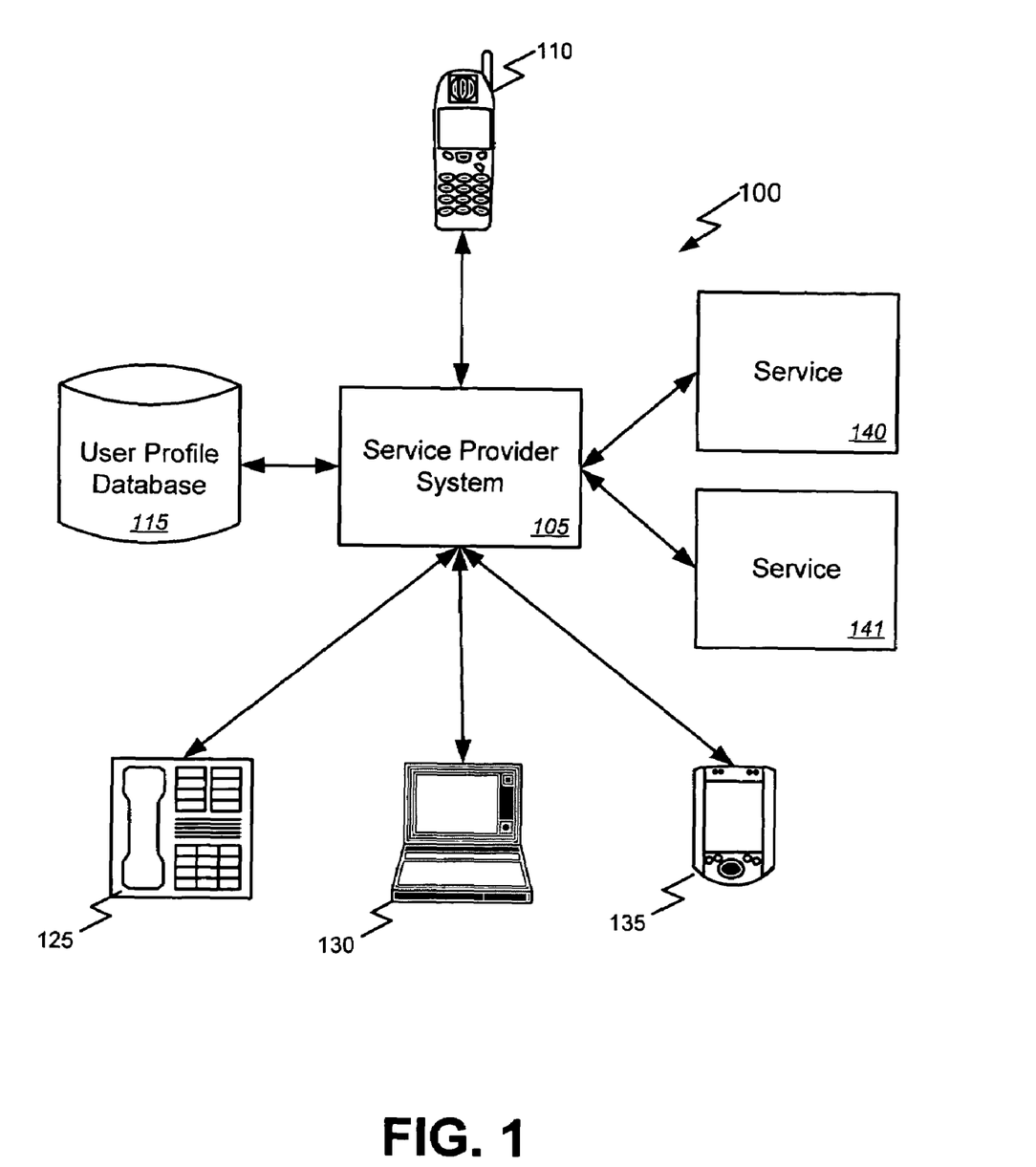
FIG. 1 is a block diagram illustrating, at a high-level, functional components of an architecture for providing content of a first media type to a recipient end device not normally associated with the first media type according to one embodiment of the present invention.

FIG. 1 is a block diagram illustrating, at a high-level, functional components of an architecture for providing content of a first media type to a recipient end device not normally associated with the first media type according to one embodiment of the present invention. In this example, the system 100 includes an initiating device 110 communicatively coupled with a service provider system 105. The service provider system 105 can be communicatively coupled with a user profile database 115 and a plurality of recipient devices 120-135.

Initiating device 110 can be any of a number of possible communication devices. While illustrated here as resembling a cell phone, initiating device can also be a land line telephone, a Personal Digital Assistant (PDA), any of a variety of wireless devices, a personal computer, etc. Regardless of the exact type of device, initiating device 110 can be communicatively coupled with service provider system 105 via typical communication media such as a cellular network, a land line telephone, a Local Area Network (LAN), Wide Area Network (WAN), the Internet, or other type of network. Through this communication media, initiating device 110 can send and receive communications to and from the service provider system 105.

Service provider system 105 can be one or more systems adapted to provide communication services of one or more types to the initiating device 110. For example, service provider system 105 can be a system providing cellular telephone services, land line telephone services, Internet services, etc. Service provider system 105 can be adapted to send and receive communications of an appropriate type to and from initiating device 110.

User profile database 115 can be communicatively coupled with service provider system 105 via a Local Area Network (LAN), Wide Area Network (WAN), the Internet, or other type of network or other communications media. While user profile database 115 is shown in this example as being separate from the service provider system 105, the user profile database may be internal or external to the service provider system 105 or may be part of and/or maintained by another system and may be either local to or remote from the service provider system 105. Regardless of the exact configuration, user profile database 115 maintains a set of user profile data or preferences for one or more users of the service provider system 105 such as a user of initiating device 110 and/or users of recipient devices 120-135. For example, the user profile database 115 may include information relating to the types and numbers of devices used by the user and/or media types that may be consumed by or that are compatible with each of those devices. Additionally or alternatively, the user profile database may include a number of user preferences for directing incoming communications such as, for example, forwarding information, preferred devices and/or formats, etc. As will be seen, such information can be used to provide content of a first media type to a recipient end device not normally associated with the first media type.

Recipient devices 120-135 can be any of a number of possible communication devices. For example, recipient devices can be cell phones, land line telephones, Personal Digital Assistants (PDAs), any of a variety of wireless devices, Personal Computers (PCs), etc. Regardless of the exact types of devices, recipient devices 120-135 can be communicatively coupled with service provider system 105 via typical communication media such as a cellular network, a land line telephone, a Local Area Network (LAN), Wide Area Network (WAN), the Internet, and/or other types of networks. Through this communication, media recipient devices 120-135 can send and receive communications to and from the service provider system 105.

Importantly, while referred to herein as a recipient device or an initiating device for the sake of explanation, any device coupled with the service provider system 105 can potentially, at various times, act as either an initiating device or a recipient device. For example, a particular cell phone may at one point initiate a call but at another time may receive a call. Therefore, the labels of initiating device and recipient device are illustrative only and indicate only a particular device's function at a specific point in time rather than indicating any limits on its functionality overall.

In use, initiating device 110 can initiate a communication, such as a phone call, email, instant message, etc. According to one embodiment of the present invention, this can be accomplished by the initiating device 110 sending a request to the service provider system 105. The request can identify a recipient device. That is, the initiating device 110 can place a call to a particular phone number or send a message to a particular email or Internet Protocol (IP) address or otherwise direct a communication to a particular recipient device. However, the recipient device and the initiating device 110 need not be of the same type. Furthermore, as will be seen, the type of communication or media being transferred from the initiating device 10 need not be compatible with the recipient device.

So, the service provider system 105 can receive from an initiating end device 110 a request for a communication with a recipient end device 135. The request from the initiating end device 110 can also include an indication of the recipient end device 135 based on a selection of a recipient end device from a user of the initiating end device 110. That is, the user of the initiating end device may select a recipient end device 135 from an address book, list of contacts, or other presentation of address information, or may directly enter a identification of the recipient end device 135 in any of a variety of manners depending upon the user interface of the initiating end device 110. Such information can be included in the request for communication from the initiating end device 110 to the service provider system 105 to allow the service provider system 105 to locate and contact the intended recipient device 135. The indication of the content of the first media type may be a pointer, address, or other indication of a location of the content or the content itself. The request from the initiating end device 110 can also include an indication of the first media type as well as other possible information.

The service provider system 105 can receive this request and detect the first media type from the request. Detection of the first media type can be based on an indication of the media type included in the request message by the initiating device 110, from reading or checking the content itself, or by other means. A second media type, appropriate for use by the recipient end device 135 can be determined. The second media type can be determined based on preference information stored for the user of the recipient device 135 stored in the user profile database 115, based on the device type of the recipient device 135, etc. For example, the user of the recipient device may indicate in one or more preferences stored in the user profile database 115 that he wants to receive all incoming communications as emails. Therefore, incoming communications should be translated into text. In another example, the recipient device may be known by the service provider system 105 or may be indicated in the user profile database 115 as being a telephone. In such a case, incoming messages should be translated into a voice or audio format.

Based on the first and/or second media types, the service provider system 105 can determine or select a service, from among a plurality of services 140 and 141 to convert the content of the first media type to content of the second media type. For example, one service 140 may represent a speech-to-text engine that may be used to convert a telephone voicemail message to text which can then be delivered, for example, to an email address. According to one embodiment, determining the service 140 to convert the content of the first media type to content of a second media type can comprise reading from the request an indication of the first media type and/or an indication of the second media type and selecting a service 140 to convert the content of the first media type to content of the second media type based on these indication(s).

Alternatively, determining the service 140 to convert the content of the first media type to content of a second media type can comprise reading preference information associated with the recipient end device 135 from the user profile database 115. The preference information from the user profile database 115 can indicate one or more media types compatible with the recipient end device 135. Therefore, a media type for the content of the first media type can be determined and a service 140 to convert the content of the first media type to content of the second media type can be selected from the plurality of services 140 and 141 based on the first media type and the preference information associated with the recipient end device 135. That is, the user of the recipient end device 135 or the recipient end device 135 itself can store in the user profile database one or more media types compatible with or acceptable by that device.

The indication of the content of the first media type can be submitted to the service 140 and an indication of the content of the second media type can be received from the service 140. That is, the service provider system 105 can send the content or a pointer, address, or other indication of the location of the content in the first media type to the selected service 140 for conversion to the second media type. In return, the selected service 140 can convert the content from the first media type to the second media type and send the content or a pointer, address, or other indication of the location of the content in the second media type to the service provider system 105. According to one embodiment, the content of the second media type can then be provided to the recipient end device 135 by, for example, passing the content, a pointer or address to the content, or other information to the recipient end device 135.

Therefore, one end device, such as a cell phone, can forward content of one type, such as a voice mail, to another end device of a different type, such as a PC or PDA, for consumption as a different media type, such as an email, via the service provider system 105. The service provider system 105 selects an appropriate service to convert or translate the media type based on the types of media and/or types of devices involved as indicated in the request message, the user profile database 115, and or the recipient device 135 itself. Importantly, it should be understood that any type of media can be used if an appropriate service is made available to the service provider system 105. For example, services can be made available for providing speech-to-text, text-to-speech, HTML-to-plain text, or any other conversion. In other cases, some media types may be incompatible with other media types. For example, a video or graphical media may not be easily represented in a textual form. In such a case, converting the content to the second media type may comprise generating a message indicating receipt of a communication of a particular type, from a particular party, at a particular time, etc. Such a message can then be provided to the recipient device in place of the content to inform the user of the communication and, perhaps, its availability via another device.

Alternatively, another architecture that provides support for communications between a number of different devices of different types may be used to provide the same functions. Such an architecture is described in the above referenced, co-pending U.S. patent application titled "Cross Platform Support for a Variety of Media Types." While not necessary to implement various embodiments of the present invention, such an architecture is considered useful with embodiments of the present invention since it provides a communication bus that in turn provides a common representation, in the form of a number of common language messages, of services or information available to, from, and between end devices regardless of the type of end device or the server providing or receiving the information or service. For example, one of these common language messages can be used to request a communication from an initiating end device or provide content to a recipient device. Furthermore, the architecture includes a central user profile database that can be used to store information related to media types, device types, etc. An overview of this architecture is now provided for convenience.

Figure 2:
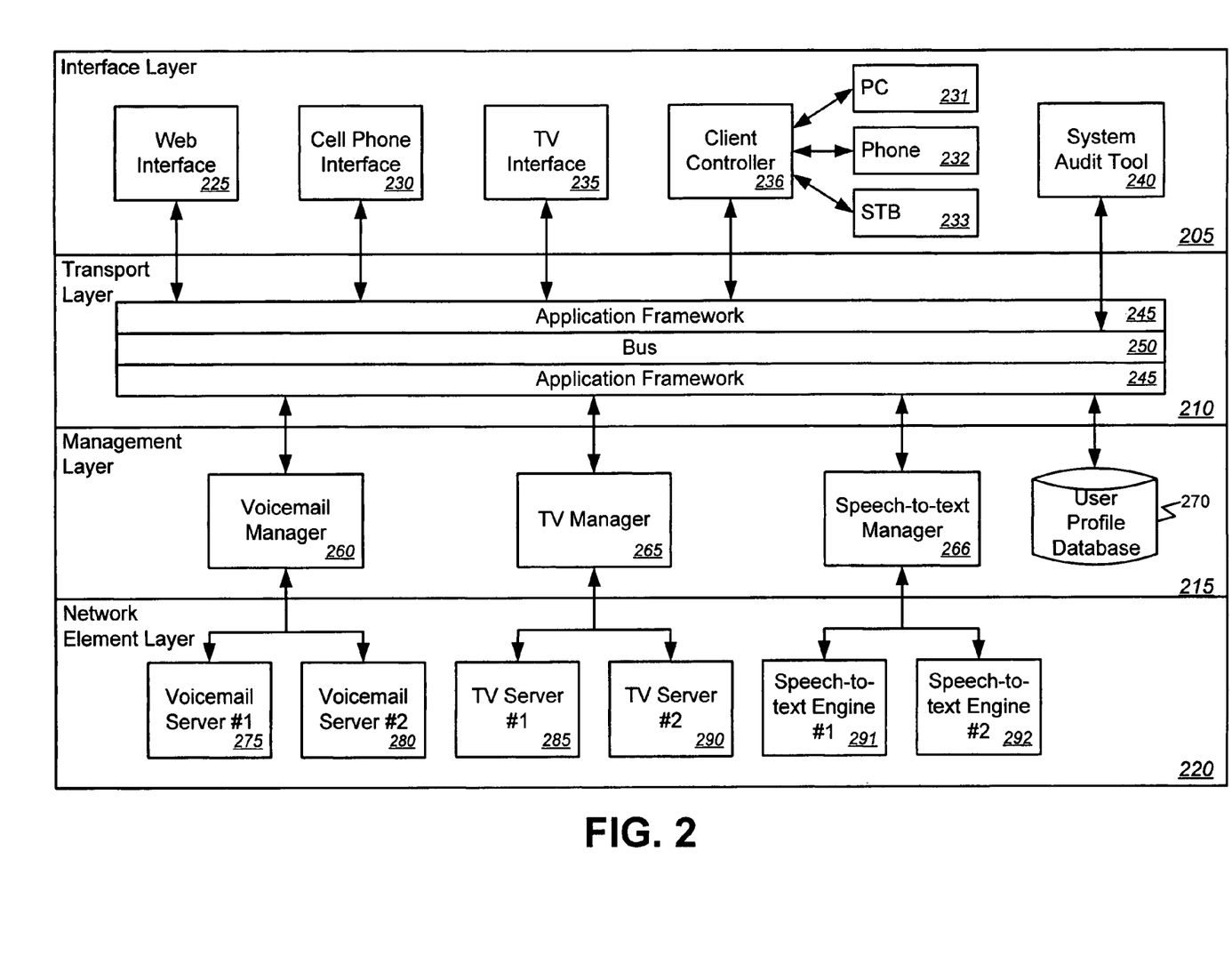
FIG. 2 is a block diagram illustrating functional component of an architecture for providing content of a first media type to a recipient end device not normally associated with the first media type according to an alternative embodiment of the present invention.

FIG. 2 is a block diagram illustrating functional component of an architecture for providing content of a first media type to a recipient end device not normally associated with the first media type according to an alternative embodiment of the present invention. In this example, the architecture is logically divided into four layers 205-220. The layers 205-220 include a network element layer 220, a management layer 215, a transport layer 210, and an interface layer 205. As will be seen, elements of each layer 205-220 can be communicatively coupled with elements of the next layer 205-220. So, elements of the network element layer 220 can be communicatively coupled with elements of the management layer 215 which in turn can be communicatively coupled with elements of the transport layer 210, etc.

The network element layer 220 can comprise one or more servers 275-292. The servers 275-292 of the network element layer 220 can each provide content and/or services of one or more types. For example, one or more servers 275 and 280 may provide voicemail services while one or more other servers 285 and 290 provide television (TV) services, while yet other servers 291 and 292 provide speech-to-text services, etc. Importantly, while this example shows a limited number of servers 275-292 in the network element layer 220, many more servers, providing a wide range of content or services of various types may be included. For example, one or more servers may be included for providing Internet services, Email services, and various other types of data, communication, and/or entertainment services.

The management layer 215 can comprise one or more managers 260-266. Each manager 260-266 can be communicatively coupled with one or more of the servers 275-292 of the network element layer 220. For example, voicemail manager can be coupled with voicemail servers 275 and 280 while TV manager 265 can be coupled with TV servers 285 and 290. Importantly, while managers 260-266 and servers 275-292 are shown and described herein as being organized by or arranged per service, other arrangements are contemplated and considered to be within the scope of the present invention. According to one alternative, the managers 260-266 and the servers 275-292 may be arranged by company or provider. So, for example, one manager may be coupled with and provide access to the services and content provided by the servers of company A while another manager may be coupled with and provide access to the services and content provided by the servers of company B. However, an arrangement of managers 260-266 and servers 275-292 based on service and/or content type may be preferable since, as will be seen, such an arrangement can provide for easier extensibility of the system when adding features or services.

Furthermore, as noted above, additional servers may be used in the network element layer 220 providing additional services and/or content of different types. Therefore, more, fewer, or different managers than shown in this example may be used in an actual implementation. For example an additional manager may be used for interfacing with one or more servers providing Internet services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

Regardless of the exact number, nature, or organization of the servers 275-292 and managers 260-266, the managers 260-266 can be adapted to translate content of the servers 275-292 with which the manager 260-266 is connected from the media types of the servers 275-292 to one or more common language messages. That is, the managers 260-266 can provide translation from a service specific format to a common or generic format. For example, voicemail server #1 275 and voicemail server #2 280 may be operated by different entities and offer different information in different formats that may be completely incompatible with each other. However, voicemail manager 260 provides for translating these different functions, formats, etc into a common language message that can be used by all other elements of the architecture.

According to one embodiment of the present invention, the managers 260-266 can provide defined interfaces to the servers 275-292 of the network element layer 220. By using calls, invocations, requests, or other signals or messages to the managers 260-266, the servers 275-292 can pass content or messages to the managers 260-266 for translation to a common language message for transmission to another element of the architecture. For example, voicemail manager 260 may provide an Application Program Interface (API) for use by any voicemail server 275 and 280 connected with the voicemail manager 260. Voicemail servers 275 and 280 can then use API calls to the voicemail manager 260 to initiate services, pass content or other information, and/or otherwise communicate with the voicemail server 260. According to one embodiment of the present invention, calls to the API or other interface may be closely analogous to the common language messages generated by the manager. For example, as will be described in detail below, the manager may generate an "InitiateCommunication" message to initiate a communication. The manager's API may also provide an "InitiateCommunication" or other similar call to the servers to which it is connected through which the servers can initiate a communication.

While use of an API or other defined interface between the managers 260-266 and the servers 275-292 is not required, it may be preferred since, by using an API or other type of defined interface, the managers 260-266 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as an "InitiateCommunication" object, with properties representing, among other possibilities, the content or other indication of data to be communicated, the intended recipient(s), etc. Such an object or common language message may be defined in a common format readable by other elements of the architecture. For example, the object may be defined in an eXtensible Markup Language (XML) file. The manager can then transmit this object or common language message to any or all of the other elements of the architecture via the transport layer 210.

The transport layer 210 can comprise a communications bus 250 communicatively coupled with each of the managers 260-266. The bus 250 can be adapted to receive and transport the one or more common language messages from the managers 260-266. The transport layer 210 can also comprise an optional application framework 245 interposed between the end devices 225-236 of the interface layer 205 and the communications bus 250 and between the managers 260-266 and the communications bus 250. Generally speaking, the application framework 245 provides for monitoring and tracking of the common language messages placed on the bus 250 of the transport layer 210.

Regardless of whether the application framework 245 is used, the bus 250 of the transport layer 210 comprises a common representation of data that is usable by all elements of the architecture. Furthermore, the bus 250 provides this message to any or all devices in the architecture as appropriate regardless of the type of device.

According to one embodiment of the present invention, the bus 250 may also be implemented using object-oriented programming techniques. In such a case, a manager placing or sending a common language message on the bus 250 can call or invoke an API or other interface of the bus 250 or otherwise cause the instantiation of an object of a particular class type, such as an "InitiateCommunication" object, with properties representing, among other possibilities, the content of data to be communicated, the intended recipient(s), etc. The bus can then make this object or common language message available to any or all of the other elements of the architecture.

The interface layer 205 of the architecture can comprise one or more end devices 225-236 of different types. For example, the end devices 225-236 can represent a cell phone 230, a web browser 225, a TV interface 235, etc all potentially operating on different platforms with different operating systems. Each end device 225-236 can be communicatively coupled with the bus 250 of the transport layer, either directly or via the application framework 245, and can be adapted to receive and translate the common language messages to a format specific to the end device based on its type.

Alternatively or additionally, one or more of the end devices may comprise a client controller 236 communicatively coupled with the bus 250 of the transport layer 210 and one or more other end devices 231-233 such as a personal computer 231, television Set-Top Box (STB) 233 for television service, telephone 232, or other type of device. If used, the client controller 236 can be adapted to receive common language messages from the bus 250, translate content from the common language messages to a format specific to the end device(s) 231-233 for which it is intended, and deliver the device specific message to the device or devices. In some cases, the client controller 236 may also be adapted to act as a firewall for end devices 231-233 communicating via the bus 250 of the transport layer 210.

Therefore, the end devices 225-236 can translate from the common language messages, such as an XML message, to device specific representations of the information in that message for presentation to a user in whatever format that device uses. According to one embodiment, the translation functions of the end devices can also be implemented using object-oriented programming techniques. In such a case, the end devices receive the common language messages such as XML encoded representations of the objects on the bus 250 of the transport layer 210. Translation can therefore comprise instantiating on the end device an object of the class indicated by the message with the properties indicated by the message thereby translating the properties of the object on the bus to a presentation language of the device.

Thus far, the description of the architecture has focused on messages from the servers 275-292 to the end devices 225-236. However, the end devices 225-236 can also be adapted to generate one or more common language messages based on user input and send the one or more common language messages to one or more of the managers 260-265 via the bus 250. For example, a cell phone 230 or other end device 225-236 can generate an "InitiateCommunication" message to be sent to any or all of the managers 260-265 or even to another end device. Therefore, the managers 260-265 can be further adapted to receive the common language messages from the end devices 225-236 via the bus 250 and to translate the common language messages to content of the media type of the servers 275-292 with which the manager 260-266 is connected.

According to one embodiment of the present invention, the architecture can include a user profile database 270 communicatively coupled with the bus 250 of the transport layer. The user profile database 270 can be adapted to maintain records of a set of user preferences for one or more of the end devices 225-236 of the interface layer 205. For example, TV or cell phone settings or options for a particular device and/or a particular user can be stored in the user profile database 270 for retrieval by one or more of the end devices 225-236 or one or more of the managers 260-266. Therefore, the user profile database 270 can be adapted to provide the preferences to one or more of the end devices 225-236 or one or more of the managers 260-266 in response to a common language message received via the bus 250. In another example, the user profile database 270 can be adapted to store information related to the individual end devices. More specifically, user profile database 270 can include information identifying each end device, the type of device, and the types of media that device is able to consume or utilize. As will be seen, such information can be used to determine or locate a service for translating communication between devices and media types.

Therefore, in use, the bus 250 provides a common representation of services or information available to, from, and between the end devices 225-236 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include an "InitiateCommunication" request message indicating a request to initiate a communication. Similarly, the common language messages can include an "InitiateCommunication" response message acknowledging initiation of a communication. As will be discussed in greater detail below, "InitiateCommunication" request and response messages can be used to request a communication from an initiating end device and/or to initiate communications with a recipient end device.

According to another embodiment of the present invention, the common language messages can also include "ConvertMedia" request and response messages. As will be seen, a "ConvertMedia" request message can be used by the managers to request a selected service to translate or convert content from one media type to another. The "ConvertMedia" response message can be used by the service to report or return the resulting conversion back to the requesting manager. The "ConvertMedia" request and response messages can both include the content or a pointer, address, or other indication of the content, before or after conversion.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an MP3 or MP4 audio or video file, a hyperlink or other direction to a location of the actual content, etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as an "InitiateCommunication" object, with properties representing, among other possibilities, the content of data to be communicated, the intended recipient(s), etc.

According to one embodiment, an initiating device 230 can initiate a communication, such as a phone call, email, instant message, etc. According to one embodiment of the present invention, this can be accomplished by the initiating device 230 sending a request, such as an "InitiateCommunication" request or other common language message, to a manager 260 associated with that device. The request can identify a recipient device. That is, the initiating device 230 can place a call to a particular phone number or send a message to a particular email or Internet Protocol (IP) address or otherwise direct a communication to a particular recipient device. However, the recipient device and the initiating device 230 need not be of the same type. Furthermore, as will be seen, the type of communication or media being transferred from the initiating device 230 need not be compatible with the recipient device.

So, the manager 260 can receive from an initiating end device 230 a request for a communication with a recipient end device 225. The request from the initiating end device 230 can also include an indication of the recipient end device 225 based on a selection of a recipient end device from a user of the initiating end device 230. That is, the user of the initiating end device 230 may select a recipient end device 225 from an address book, list of contacts, or other presentation of address information, or may directly enter a identification of the recipient end device 225 in any of a variety of manners depending upon the user interface of the initiating end device 230. Such information can be included in the request for communication from the initiating end device 230 to the manager 260 to allow the manager 260 to locate and contact the intended recipient device 225. The indication of the content of the first media type may be a pointer, address, or other indication of a location of the content or the content itself. The request from the initiating end device 230 can also include an indication of the first media type as well as other possible information.

The manager 260 can receive this request and determine or select a service to convert the content of the first media type to content of a second media as described in co-pending U.S. applications entitled "Cross-Platform Push of Various Media Types referenced above. That is, the manager 260 can, upon receiving the request, can determine or select a service provided by another manager, from among a plurality of services to convert the content of the first media type to content of a second media type compatible with the recipient end device 225. Then the manager 260 can send, via a "ConvertMedia" or other common language message, the content or a pointer, address, or other indication of the location of the content in the first media type to the selected service 291 for conversion to the second media type. In return, the selected service 291 can convert the content from the first media type to the second media type and send the content or a pointer, address, or other indication of the location of the content in the second media type to the manager 260. A communication with the recipient end device 225 can be initiated between the recipient device 225 and the manager 260 to deliver the content of the second media type to the recipient device.

Alternatively, the request can be passed from the manager to one of the recipient devices without the manager 260 first selecting a service for converting the contents. For example, according to one embodiment, the request can be passed from the manager 260 to a client controller 236 coupled with a plurality of end devices 231-233. In such a case, the client controller 236 can receive the request and detect the first media type from the request. Detection of the first media type can be based on an indication of the media type included in the request message by the initiating device 230, from reading or checking the content itself, or by other means. A second media type, appropriate for use by the recipient end device 232 can be determined. The second media type can be determined based on preference information stored for the user of the recipient device 232 stored in the user profile database 270, based on the device type of the recipient device 232, etc. For example, the user of the recipient device 232 may indicate in one or more preferences stored in the user profile database 270 that he wants to receive all incoming communications as emails. Therefore, incoming communications should be translated into text. In another example, the recipient device 232 may be known by the client controller 236 or may be indicated in the user profile database 270 as being a telephone. In such a case, incoming messages should be translated into a voice or audio format.

The client controller can then determine or select a service provided by another manager, from among a plurality of services to convert the content of the first media type to content of a second media type compatible with the recipient end device 232. For example, one service 291 provided by one manager 266 may represent a speech-to-text engine that may be used to convert a telephone voicemail message to text which can then be delivered, for example, to an email address. According to one embodiment, determining the service 291 to convert the content of the first media type to content of a second media type can comprise reading from the request an indication of the first media type and/or an indication of the second media type and selecting a service 291 to convert the content of the first media type to content of the second media type based on these indication(s).

Alternatively, determining the service 291 to convert the content of the first media type to content of a second media type can comprise reading preference information associated with the recipient end device 232 from the user profile database 270 or from the client controller 236. The preference information from can indicate one or more media types compatible with the recipient end device 232. Therefore, a media type for the content of the first media type can be determined and a service 291 to convert the content of the first media type to content of the second media type can be selected from the plurality of services based on the first media type and the preference information associated with the recipient end device 232.

The indication of the content of the first media type can be submitted to the service 291 and an indication of the content of the second media type can be received from the service 291. That is, the client controller 236 can send, via a "ConvertMedia" or other common language message, the content or a pointer, address, or other indication of the location of the content in the first media type to the selected service 291 for conversion to the second media type. In return, the selected service 291 can convert the content from the first media type to the second media type and send the content or a pointer, address, or other indication of the location of the content in the second media type to the client controller 236. The content can then be provided to the recipient end device 232 by the client controller 236 by, for example, passing the content, a pointer or address to the content, or other information to the recipient end device 232.

Therefore, one end device, such as a cell phone, can forward content of one type, such as a voice mail, to another end device of a different type, such as a PC or PDA, for consumption as a different media type, such as an email, via the manager 260. The manager, client controller, or recipient device selects an appropriate service 291 to convert or translate the media type based on the types of media or types of devices involved as indicated in the request message and/or the user profile database 270. Importantly, it should be understood that any type of media can be used if an appropriate service is made available to the managers. For example, services can be made available for providing speech-to-text, text-to-speech, HTML-to-plain text, or any other conversion.

In other cases, some media types may be incompatible with other media types. For example, a video or graphical media may not be easily represented in a textual form. In such a case, converting the content to the second media type may comprise generating a message indicating receipt of a communication of a particular type, from a particular party, at a particular time, etc. Such a message can then be provided to the recipient device in place of the content to inform the user of the communication and, perhaps, its availability via another device.

Figure 3:
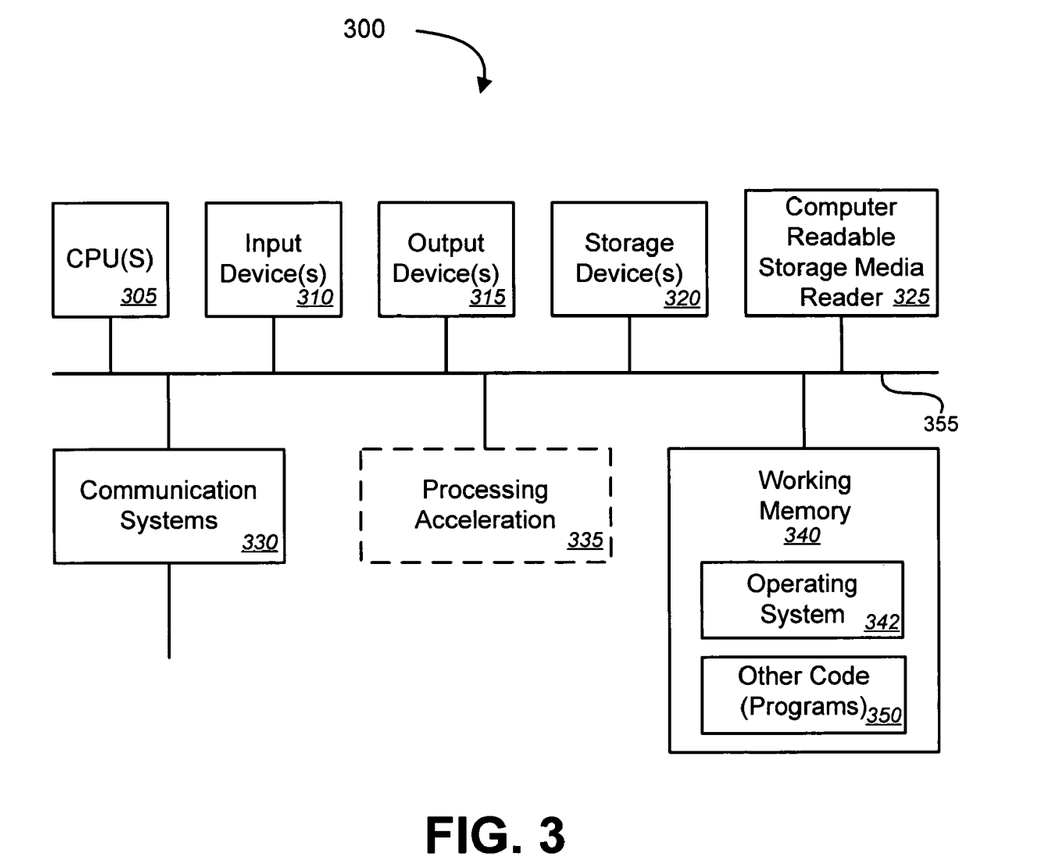
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates a computer system 300 such as may be used, in whole, in part, or with various modifications, to provide various components of the systems discussed above.

The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device (s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 445 and/or other code 350. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code 350 for implementing any or all of the function of the various elements of the architectures as described herein. For example, software, stored on and/or executed by a computer system such as system 300, can provide the functions of the service provider system, a manager, an end device, etc. Methods implemented by software on some of these components will be discussed in detail below.

Figure 4:
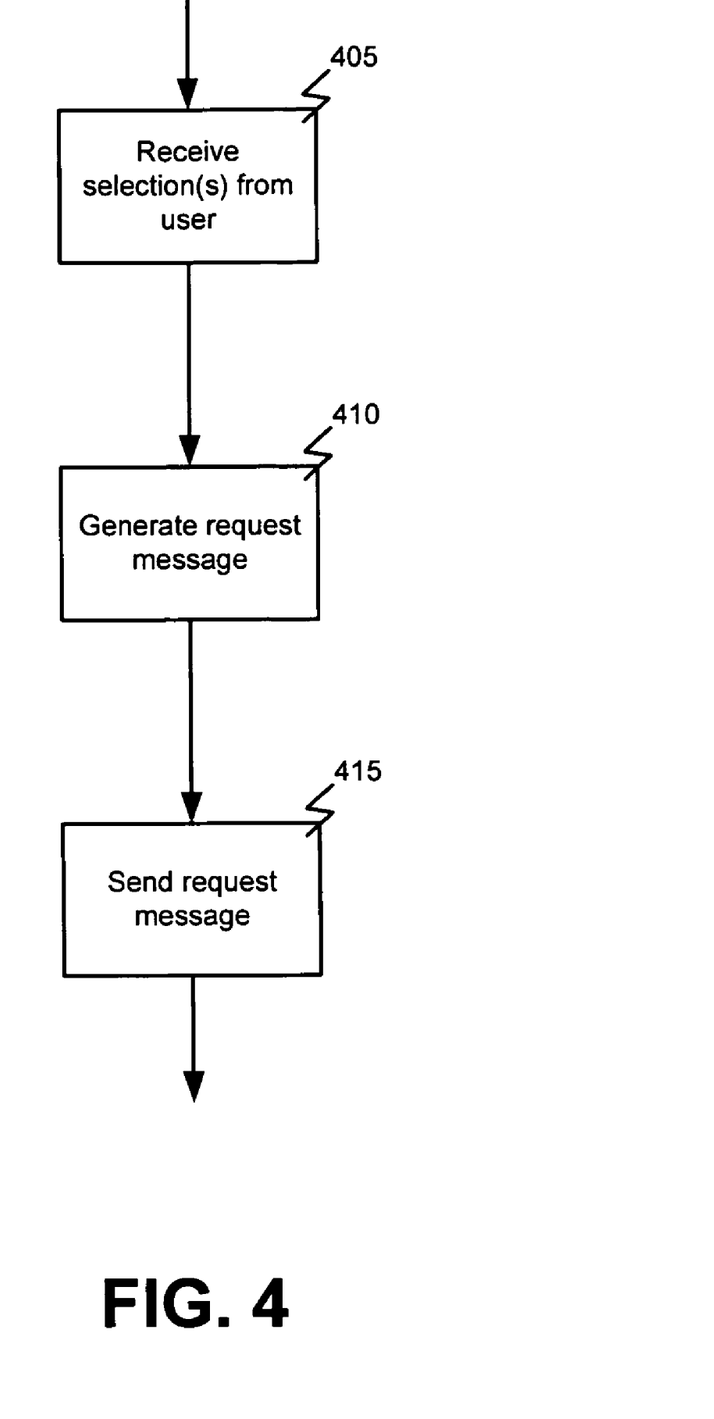
FIG. 4 is a flowchart illustrating a process for an end device to initiate providing content of a first media type to a recipient end device not normally associated with the first media type according to one embodiment of the present invention.

FIG. 4 is a flowchart illustrating a process for an end device to initiate providing content of a first media type to a recipient end device not normally associated with the first media type according to one embodiment of the present invention. This example illustrates a process that may be implemented when a user of an end device uses the end device to forward content or otherwise initiate a communication to another end device of a different type.

Here, the process begins when the device receives 405 one or more selections from the user via the user interface of the device. That is, the user of the initiating end device may select a recipient end device from an address book, list of contacts, or other presentation of address information, or may directly enter a identification of the recipient end device in any of a variety of manners depending upon the user interface of the initiating end device. Such information can be included in the request for communication from the initiating end device. The request from the initiating end device can also include an indication of the content to be communicated, i.e., the content of the first media type. The indication of the content of the first media type may be a pointer, address, or other indication of a location of the content or the content itself. The request from the initiating end device can also include an indication of the first media type, an indication of the second media type, as well as other possible information. Again, such information can be selected or entered by the user of the end device in a wide variety of ways depending upon the user interface of the initiating device.

Once the user selections have been received 405, a request message can be generated 410. The request message can comprise a common language message such as an "InitiateCommunication" request message as described above or any other type of message to initiate communications and to pass the user selections to an appropriate manager or service provider system. The message can then be sent 415 to such a manager or service provider system depending upon the architecture being implemented.

Figure 5:
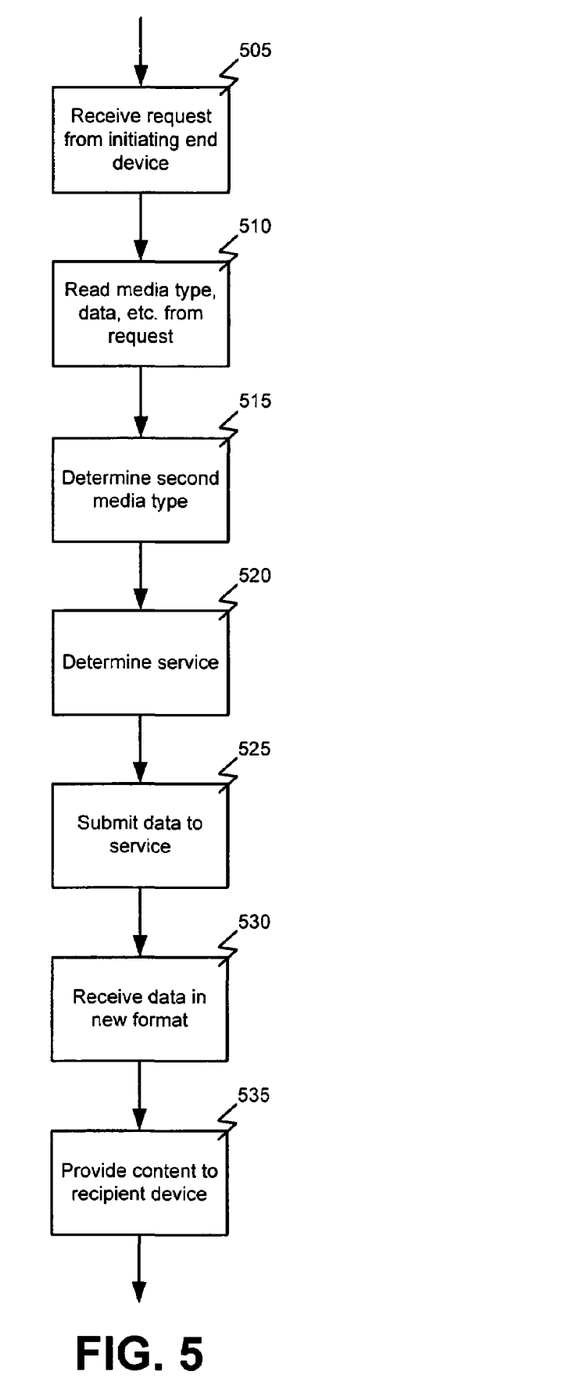
FIG. 5 is a flowchart illustrating a process for providing content of a first media type to a recipient end device not normally associated with the first media type according to one embodiment of the present invention.

FIG. 5 is a flowchart illustrating a process for providing content of a first media type to a recipient end device not normally associated with the first media type according to one embodiment of the present invention. In this example, the process begins with receiving 505 from an initiating end device a request for a communication with the recipient end device. The request may, for example, be in the form of an "InitiateCommunication" request message as described above or another type of communication request. As noted above, the request can include an indication of the content of the first media type as well and an indication of the first media type, the second media type, the recipient device, and other information.

Such information can be read 510 from the request message and the second media type can be determined 515. As noted above, determining 515 the second media type can be based on information in the request, the content itself, preference, device, or other information in the user profile database, or information from the end device or client controller.

Based on the first and/or second media types, a service to convert the content of the first media type to content of the second media type that is compatible with the recipient end device can be determined 520. According to one embodiment, determining 520 the service to convert the content of the first media type to content of a second media type comprises reading preference information associated with the recipient end device. The preference information, such as stored in a user profile database as described above, can indicate one or more media types compatible with the recipient end device. The first media type can be determined from the contents themselves or from an indication in the request from the initiating device. A service to convert the content of the first media type to content of the second media type can be selected from a plurality of services based on the first media type and the preference information associated with the recipient end device.

The indication of the content of the first media type can be submitted 525 to the service for translation or conversion. Submission of the content of the first media type can be accomplished by supplying the content or some indication of the content such as a pointer, address, or other indication that can be used by the service to locate and/or obtain the content. As discussed above, this can be accomplished via a "ConvertMedia" request message or similar message used to request conversion of the content by the selected service.

After the content has been translated or converted by the service, an indication of the content of the second media type can be received 530 from the service. This indication can also be the content itself or a pointer address, or other indication that can be used to locate or obtain the content. As discussed above, this can be accomplished via a "ConvertMedia" response message or similar message used to return converted content from the selected service.

The content of the second media type can then be provided 535 to the recipient device. That is the convert content can be forwarded or sent to the recipient device, for example, via an "InitiateCommunication" request message as discussed above or other message used to initiate a communication with the recipient device or to send the content to the recipient device. Also as noted above, the message can include an indication of the content of the second media type such as the content or a pointer, address or other indication. This message can be sent 535 to the recipient device to initiate a communication with the recipient device or provide the content of the second media type to the recipient device.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for cross-platform communications of a variety of media types, the system comprising:
   a communications bus;
   a user profile database communicatively coupled with the communications bus and adapted to maintain profile information for a plurality of end devices;

a first end device communicatively coupled with the communications bus and adapted to send and receive common language messages via the communications bus, to translate common language messages received from the communications bus to a format specific to the end device based on the type, and to store user profile information in the user profile database;

a second end device adapted to send and receive common language messages via the communications bus, to translate common language messages received from the communications bus to a format specific to the end device based on the type, and to store user profile information in the user profile database; and a client controller communicatively coupled with the communications bus and the second end device, wherein the client controller is adapted to receive from the first end device a common language message indicating a request for a communication with the second end device, wherein the common language message includes an indication of content of a first media type, to detect the first media type from the request, to determine a second media type appropriate for use by the recipient end device, to determine a service to convert the content of the first media type to content of the second media type, to submit the indication of the content of the first media type to the service, to receive an indication of the content of the second media type from the service, and to provide the content of the second media type to the recipient end device.

2. The system of claim 1, wherein the client controller determines a second media type appropriate for use by the recipient end device based on preferences of a user of the recipient end device.

3. The system of claim 2, wherein the client controller determines a second media type appropriate for use by the recipient end device based on a device type of the recipient end device.

4. The system of claim 1, wherein the indication of the content of the first media type comprises the content of the first media type.

5. The system of claim 1, wherein the indication of the content of the second media type comprises the content of the second media type.

6. The system of claim 1, wherein the client controller determines the service to convert the content of the first media type to content of a second media type by:

reading from the common language message an indication of the first media type and an indication of the second media type; and selecting a service to convert the content of the first media type to content of the second media type from the plurality of services based on the indication of the first media type and the second media type.

7. The system of claim 1, wherein the client controller determines the service to convert the content of the first media type to content of a second media type by:

reading profile information associated with the second end device from the user profile database, the profile information indicating one or more media types compatible with the second end device;

determining a media type for the content of the first media type; and selecting a service to convert the content of the first media type to content of the second media type from the plurality of services based on the first media type and the profile information associated with the second end device.

8. The system of claim 1, wherein the first end device is adapted to generate the common language message, wherein the common language message includes an indication of the second end device based on a selection of a second end device from a user of the first end device.

9. The system of claim 1, wherein the common language message from the first end device includes the content of the first media type.

10. The system of claim 1, wherein the first end device is adapted to generate the common language message from the first end device, wherein the common language message includes an indication of the second media type.

* * * * *

UNITED STATES PATENT AND TRADEMARK OFFICE
CERTIFICATE OF CORRECTION

| | | |
|---|---|---|
| PATENT NO. | : 7,596,369 B2 | |
| APPLICATION NO. | : 11/399098 | |
| DATED | : September 29, 2009 | |
| INVENTOR(S) | : Jordan Alperin and Rich Cerami | |

It is certified that error appears in the above-identified patent and that said Letters Patent is hereby corrected as shown below:

Column 1, Line 27, replace "associate" with "associated", therefor.

Column 3, Line 29, replace "component" with "components", therefor.

Column 5, Line 48, replace "a" with "an", therefor.

Column 7, Line 35, replace "component" with "components", therefor.

Column 12, Line 35, replace "applications" with "application", therefor.

Column 12, Line 36, delete "Types referenced above." and insert --Types" referenced above.--, therefor.

Column 12, Line 37, delete "the request, can determine" and insert --the request, determine--, therefor.

Column 15, Line 14, replace "a" with "an", therefor.

Signed and Sealed this
Seventh Day of June, 2011

David J. Kappos
*Director of the United States Patent and Trademark Office*